United States Patent
Brinkman et al.

(10) Patent No.: US 9,005,486 B2
(45) Date of Patent: Apr. 14, 2015

(54) PROTON CONDUCTING CERAMICS IN MEMBRANE SEPARATIONS

(75) Inventors: Kyle S. Brinkman, Aiken, SC (US); Paul S. Korinko, Aiken, SC (US); Elise B. Fox, Aiken, SC (US); Frank Chen, Irmo, SC (US)

(73) Assignees: Savannah River Nuclear Solutions, LLC, Aiken, SC (US); University of South Carolina, Columbia, SC (US)

( * ) Notice: Subject to any disclaimer, the term of this patent is extended or adjusted under 35 U.S.C. 154(b) by 1030 days.

(21) Appl. No.: 13/066,166

(22) Filed: Apr. 7, 2011

(65) Prior Publication Data

US 2011/0297894 A1    Dec. 8, 2011

Related U.S. Application Data

(60) Provisional application No. 61/321,652, filed on Apr. 7, 2010.

(51) Int. Cl.
| | | |
|---|---|---|
| *H01B 1/08* | (2006.01) | |
| *C01F 17/00* | (2006.01) | |
| *C04B 35/50* | (2006.01) | |
| *C04B 35/624* | (2006.01) | |
| *C04B 35/626* | (2006.01) | |

(52) U.S. Cl.
CPC .............. *H01B 1/08* (2013.01); *C01F 17/0018* (2013.01); *C01P 2002/02* (2013.01); *C01P 2002/04* (2013.01); *C01P 2002/34* (2013.01); *C01P 2002/72* (2013.01); *C01P 2002/88* (2013.01); *C01P 2004/52* (2013.01); *C04B 35/50* (2013.01); *C04B 35/624* (2013.01); *C04B 35/6267* (2013.01); *C04B 2235/3213* (2013.01); *C04B 2235/3215* (2013.01); *C04B 2235/3224* (2013.01); *C04B 2235/3229* (2013.01); *C04B 2235/443* (2013.01); *C04B 2235/666* (2013.01); *C04B 2235/768* (2013.01)

(58) Field of Classification Search
USPC ....................... 429/479, 492, 495; 423/593.1; 252/518.1, 521.1; 95/45
See application file for complete search history.

(56) References Cited

U.S. PATENT DOCUMENTS

| | | | |
|---|---|---|---|
| 7,258,820 | B2 | 8/2007 | Elangovan et al. |
| 7,413,687 | B2 | 8/2008 | Armstrong et al. |
| 7,682,494 | B2 | 3/2010 | Berland et al. |
| 7,901,730 | B2 | 3/2011 | Johnson et al. |
| 8,012,380 | B2 | 9/2011 | Elangovan et al. |
| 8,394,352 | B2 | 3/2013 | Chen et al. |
| 2005/0194571 | A1 | 9/2005 | Elangovan |
| 2006/0257704 | A1 | 11/2006 | Ogino et al. |
| 2011/0084237 | A1 | 4/2011 | Wachsman et al. |

OTHER PUBLICATIONS

Synthesis and Application of Porous Sm0.2Ce0.8O1.9 Nanocrystal Aggregates, Liu et al.,J. Phys. Chem. C 2009, 113, 17262-17267.*
Nanoscale Effects on the Ionic Conductivity of Highly Doped Bulk Nanometric Cerium Oxide, Anselmi-Tamburini et al., Adv. Funct. Mater. 2006, 16, 2363-2368.*
Synthesis and electrical properties of BaCeO3-based proton conductors by calcinations of metal-polyvinyl alcohol gel, J.-H. Xu et al., Journal of Alloys and Compounds 551 (2013) 333-337.*
Structure/Property Relations in Bulk Versus Solution Derived Proton Conducting Ceramics of the Form SrCe0.95Yb0.05O3—☐With Applications in Membrane Separations, Brinkman et al., Mater. Res. Soc. Symp. Proc. vol. 1256 © 2010 Materials Research Society.*

* cited by examiner

*Primary Examiner* — Mark Kopec
*Assistant Examiner* — Haidung Nguyen
(74) *Attorney, Agent, or Firm* — J. Bennett Mullinax, LLC

(57) ABSTRACT

Perovskite materials of the general formula $SrCeO_3$ and $BaCeO_3$ are provided having improved conductivity while maintaining an original ratio of chemical constituents, by altering the microstructure of the material. A process of making Pervoskite materials is also provided in which wet chemical techniques are used to fabricate nanocrystalline ceramic materials which have improved grain size and allow lower temperature densification than is obtainable with conventional solid-state reaction processing.

7 Claims, 9 Drawing Sheets

SPS ORDER MAGNITUDE GREATER CONDUCTIVITY UP TO T~600°C

PROTON CONDUCTING CERAMICS IN MEMBRANE SEPARATIONS

RELATED APPLICATIONS

This application claims the benefit of U.S. Provisional Application having Ser. No. 61/321,652 filed on Apr. 7, 2010 entitled STRUCTURE/PROPERTY RELATIONS IN BULK VERSUS SOLUTION DERIVED PROTON CONDUCTING CERAMICS OF THE FORM $SrCe_{0.95}Yb_{0.05}O_{3-\delta}$ WITH APPLICATIONS IN MEMBRANE SEPARATIONS and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

The present invention relates to ionic transport membranes for energy conversion devices. Such membranes must have both proton and electronic conductivity to function as a hydrogen separation membrane without using an external power supply. The materials and process of the present invention address ways to modify the materials transport properties through control of grain size with applications such as improving the hydrogen flux through a gas separation membrane.

BACKGROUND OF THE INVENTION

Membrane separations are a key enabling technology for energy conversion devices. Ionic transport membranes must have both proton and electronic conductivity to function as hydrogen separation membranes without an external power supply. A technical obstacle to material modification by compositional changes is that the hydrogen flux through a dense membrane is a function of both the proton ionic conductivity and the electronic conductivity.

In addition, the materials electronic conductivity or material crystal structure stability should not be greatly affected by the presence of contaminant gases such as $CO_2$, $CO$, $CH_4$ and $H_2O$ which are commonly associated with from steam reforming/water gas shift reactions. Perovskite materials of the general formula $SrCeO_3$ and $BaCeO_3$ form the basis of most ceramic compositions with proton conductivities in the range of $2\times10^{-2}$ S/cm at 600° C., showing good stability under the extremely low oxygen partial pressure where many Perovskites decompose to their primary oxides, "A"-site doping of the $ABO_3$ Perovskite structure and stoichiometry modifications have been explored to increase the stability in the presence of contaminated gases while maintaining acceptable proton conductivity levels.

There remains room for variation and improvements in the art of conductive membrane and hydrogen flux through a membrane.

SUMMARY OF THE INVENTION

It is an aspect of at least one embodiment of the present invention to provide for Perovskite materials of the general formula $SrCeO_3$ and $BaCeO_3$ having improved conductivity while maintaining an original ratio of chemical constituents, by altering the microstructure of the material.

It is yet a further and more particular aspect of at least one embodiment of this invention to provide for a process of making Pervoskite materials in which wet chemical techniques are used to fabricate nanocrystalline ceramic materials which have improved grain size and allow lower temperature densification than is obtainable with conventional solid-state reaction processing.

It is yet a further aspect of at least one embodiment of the present invention to provide for a chemically derived $SrCeO_3$ and $BaCeO_3$ structures having a smaller grain size and a corresponding improvement in electron conductivity than materials fabricated using solid-state reaction processing.

It is yet a further aspect of at least one embodiment of the present invention to provide a material according to the formula $ACe_xM_{1-x}O_3$ where A can be Sr or Ba, M is a +3 valence dopant of Y, Yb, Eu, Gd that substitutes for in the B site of the $ABO_3$ Perovskite crystal structure and x varies from 1 to near zero.

It is yet a further aspect of at least one embodiment of the present invention to provide membranes of a Perovskite type crystal structure having a reducible cation in the B site of $ABO_3$ structure which will reduce from +4 to +3 in reducing atmosphere resulting in i) increase in oxygen vacancy concentration accompanied by ii) an increase in electronic conductivity and enhanced proton transport.

It is a further aspect of at least one embodiment of the present invention to provide for an improved ceramic membrane and process of making the membrane in which the ceramic membranes have grain boundaries creating an oxygen vacancy that provides for greater hydrogen flux through the membrane.

It is a further aspect of at least one embodiment of the present invention to provide for a process and resulting product of using nanoscale ceramic powders in combination with a rapid sintering process, such as spark plasma sintering, to provide for dense nanocrystalline ceramics having enhanced electrical conductivity properties.

It is a further aspect of at least one embodiment of the present invention to provide for an improved nanocrystalline ceramic which may be in the form of a membrane, an anode, or a substrate for catalytic addition.

It is a further aspect of at least one embodiment of the present invention to provide for A nanocrystalline conducting ceramic having the formula $ACe_xM_1-xO_3$ where A can be Sr or Ba and M is selected from the group consisting of Y, Yb, Eu, Gd, Sm and X varies from 1 to 0 having at least about a 3% weight loss of oxygen while maintaining the ratio of chemical constituents within the ceramic. The nanocrystalline conducting ceramic exhibits both proton conductivity and ionic conductivity and are useful in the formation of a membrane used in gas separation or in a solid oxide fuel cell.

It is a further aspect of at least one embodiment of the present invention to provide a process of making a nanocrystalline conducting ceramic comprising the steps of: providing a stoichiometric ratio of precursor reactants in an aqueous solution; adding urea and a PVA solution to the precursor reactants, said urea decomposing to $NH_3$ and $CO_2$ thereby forming a dough precursor; heating said dough precursor to obtain an amorphous precursor powder; and sintering said precursor powder to form a membrane. In some embodiments, it is useful to use a spark plasma sintering process.

It is a further aspect of at least one embodiment of the present invention to provide a nanocrystalline conducting ceramic having the formula $ACe_xM_1-xO_3$ where A can be Sr or Ba and M is selected from the group consisting of Y, Yb, Eu, Gd, Sm and X varies from 1 to 0, the nanocrystalline conducting ceramic having an average grain size of about 1.0 micron. The resulting conducting ceramic has a hydrogen flux value at least about one order of magnitude greater than a similar ceramic having an average grain size of 10 microns or greater.

BRIEF DESCRIPTION OF THE FIGURES

FIG. 3b is a scanning electron micrograph of the material prepared and analyzed in reference to FIG. 3a.

DESCRIPTION OF THE PREFERRED EMBODIMENT

Figure 1A:
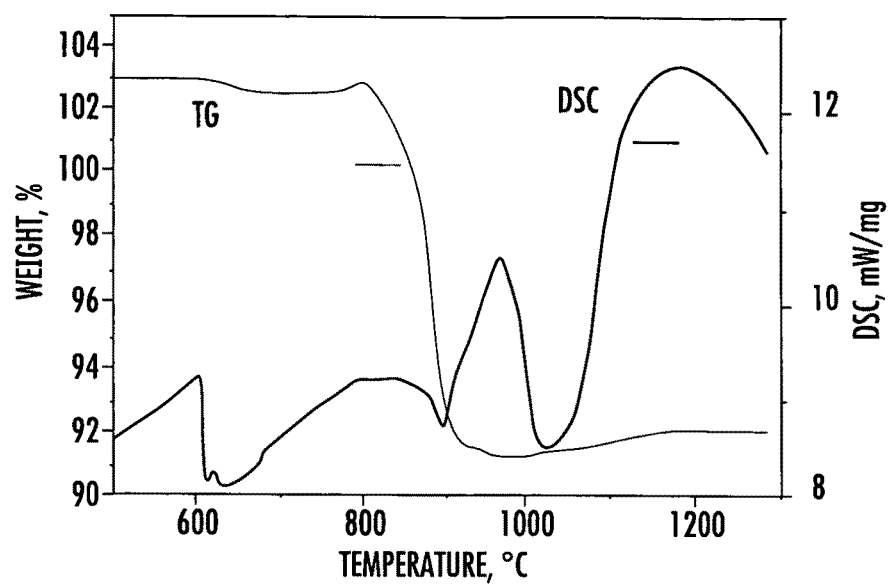
FIG. 1a sets forth TG/DSC data setting forth a continuous weight loss event between 800° C. to 1000° C. indicating a crystallization event for the $SrCe_{0.95}Yb_{0.05}O_{3-\delta}$.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with this invention, it has been found possible to modify materials conductivity, without changing the ratio of the chemical constituents, by altering the microstructure. In this study, $SrCe_{0.95}Yb_{0.05}O_3$ was produced by conventional mixed oxide bulk ceramic techniques and chemical solution routes self-rising approaches using urea as the leavening agent. In conventional ceramic processing routes, the Perovskite phase was observed to form at temperatures near 1300° C., while solution techniques resulted in Perovskite phase formation starting near 1000° C. with complete phase transformations occurring at 1100° C. Thermogravimetric analysis (TGA) was conducted in various gas atmospheres resulting in bulk oxide route powders exhibiting a 0.6% weight loss at 800° C. under a nitrogen environment as compared to chemically derived powders which displayed weight losses on the order of 3.4%. The increase weight loss observed in chemically derived $SrCe_{0.95}Yb_{0.05}O_3$ is correlated with an increase in the number of electron charge carriers and results in elevated electronic conduction. The present invention provides for synthesis of dense nanocrystalline $SrCe_{0.95}Yb_{0.05}O_3$ proton conducting ceramic membranes. Wet chemical techniques are used to fabricate nanocrystalline ceramic materials which enable lower temperature densification and results in membranes with dramatically smaller grain size than that is obtainable with conventional solid-state reaction processing. As a result of the smaller grain size, an improvement in the electronic conductivity can be obtained.

$SrCe_{0.95}Yb_{0.05}O_3$ was produced via self-rising approach using urea as the leavening agent and PVA as the dough former. $Sr(NO_3)_2$, $Ce(NO_3)_3.6H_2O$ and $Yb(NO_3)_3.6H_2O$ (precursor reactants) were mixed in stoichiometric ratio and dissolved into distilled water. Urea and PVA solution was added to the nitrate salt solution resulting in a sticky dough precursor upon solvent evaporation. The precursor was fired at 500° C. to obtain an amorphous precursor powder and Thermogravimetric analysis combined with Differential Scanning calorimetry (TGA-DSC) was used to examine the precursor powder using a heating rate of 10° C. per minute up to 1400° C. The gas flow was nominally kept at 50 sccm air equivalent 5° C./min on a Perkin Elmer unit. Conventional bulk oxide processing was also employed by mixing $SrCO_3$, $Yb_2O_3$ and $CeO_2$ in the stoichiometric ratios followed by ball milling in ethanol and subsequent calcinations 1300° C. 5 hours at 5° C./min followed by sintering at 1500° C. for 10 hours at 2° C./min ramp rate. XRD was performed on a PanAnalytical X-ray diffractometer. SEM and TEM electron microscope characterization was performed on FEI Quanta and XL 30 model system.

While the above examples of the self-rising approach is set forth using specific reagents, it is believed that a similar process using the various constituents identified in the general formula will achieve similar membranes having similar properties.

Figure 1B:
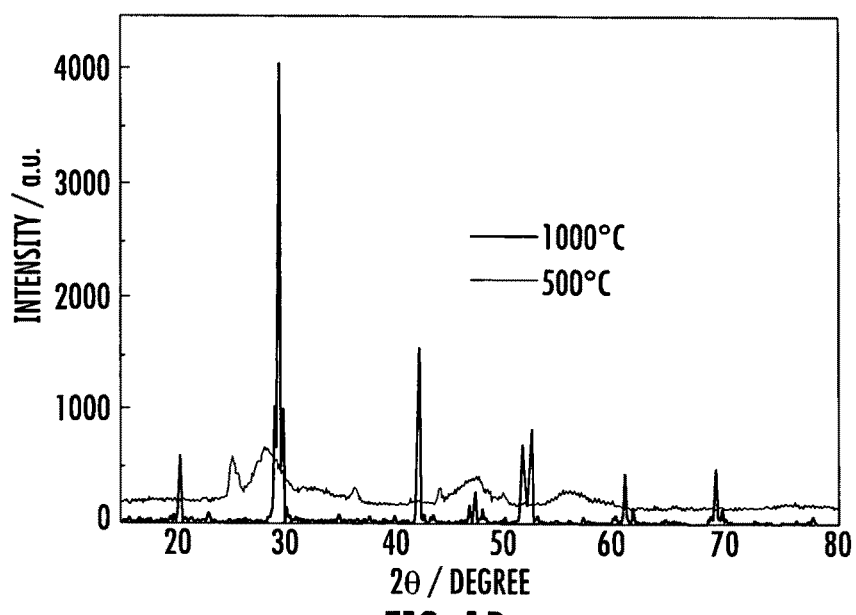
FIG. 1b sets forth the Perovskite phase for $SrCe_{0.95}Yb_{0.05}O_{3-\delta}$ observed at calcinations at 1000° C.
Figure 2A:
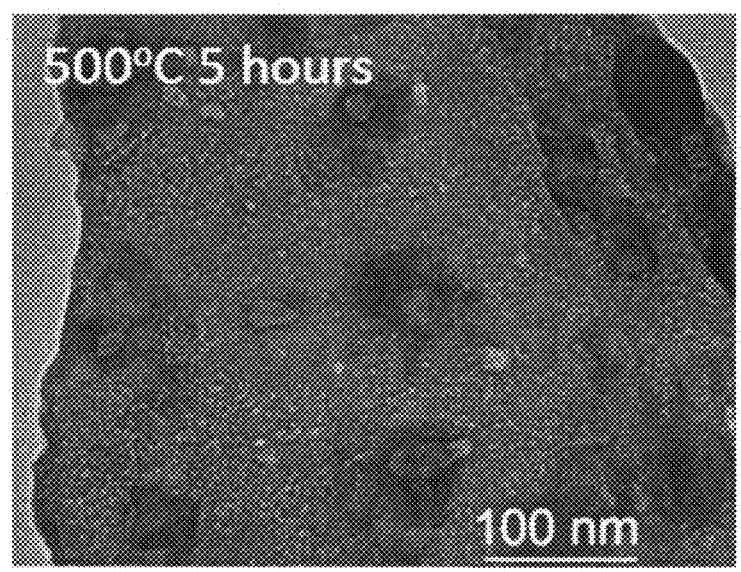
FIG. 2a-2c are electron micrographs of $SrCe_{0.95}Yb_{0.05}O_{3-\delta}$ following calcinations at various temperatures and treatment intervals.

The thermal process of as-synthesized $SrCe_{0.95}Yb_{0.05}O_3$ obtained by self-rising approach was recorded by TG/DSC is shown in FIG. 1a. A continuous weight loss event was observed starting near 800° C. which extends to 1000° C. concomitant with an exothermic calorimetric signal near 1000° C. indicating a crystallization event. To investigate the phase evolution, the as-synthesized $SrCe_{0.95}Yb_{0.05}O_3$ powders were calcined at temperatures from 600-1100° C. in air for 5 h. FIG. 1b displays the XRD spectra of powders calcined at 500 and 1000° C. representing the amorphous starting material and initial $SrCe_{0.95}Yb_{0.05}O_3$ crystallization. As shown in FIG. 1b, the Perovskite phase $SrCe_{0.95}Yb_{0.05}O_3$ was observed to form after calcinations at 1000° C. Electron microscopy (SEM/TEM) investigations on the resulting powder SrCe$_{0.95}$Yb$_{0.05}$O$_3$ synthesized by a self-rising route showed the material to be porous after high temperature calcinations displayed in FIG. 2a-c).

Figure 2B:
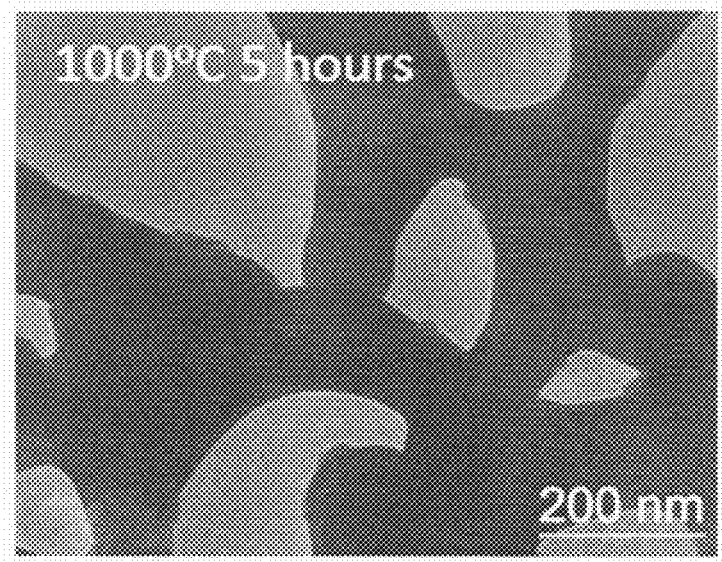
Figure 2C:
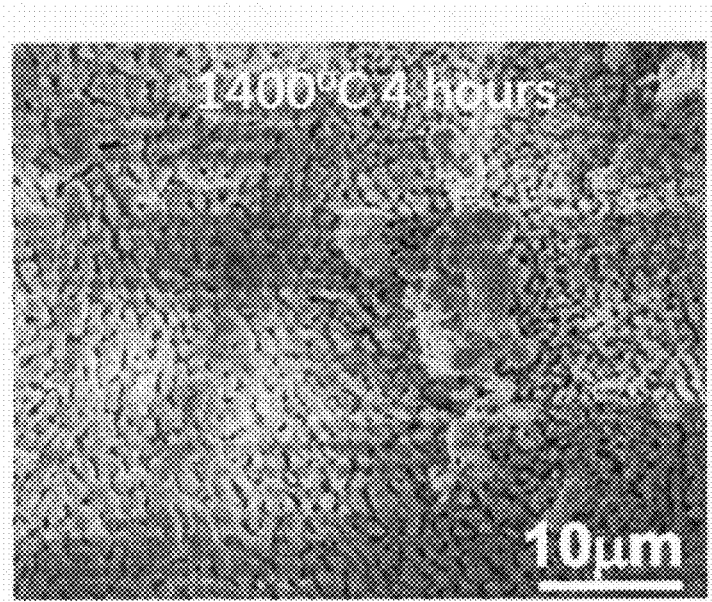

The average particle size as observed by TEM investigations was 100 nm when the calcinations temperature was 1000° C. as shown in FIG. 2b. However, the particle size increased sharply to 1 μm after firing at 1100° C. for 5 h (shown in FIG. 2c). A relatively high calcinations temperature was necessary in order to obtain single phase SrCe$_{0.95}$Yb$_{0.05}$O$_3$ which led to extensive grain growth and the particle coarsening to sized on the order of micron. Thermal analysis results demonstrate that the SrCe$_{0.95}$Yb$_{0.05}$O$_3$ powder involves the following steps ytterbium carbonate decomposition (endothermic onset at 580° C., and weight loss), and strontium carbonate decomposition (endothermic onset at 900° C., and associated weight loss), exothermic crystallization with peak near 1000° C. with no associated weight loss with the process reaching completion at 1100° C.

Wet chemical techniques such as the self rising approach have been used to fabricate nanocrystalline ceramic membranes which enable lower temperature crystallization (1100° C.) and result in dramatically smaller particle size (1 micron) than is obtainable with conventional solid-state reaction processing (1300° C. and 10 micron). Thermogravimetric (TGA) analysis showed that smaller, chemically derived powders exhibited near five times greater loss of oxygen (0.6% solid-state reaction, versus 3.4% chemical method measured under N$_2$; and 1.3% solid state-reaction versus 4% chemical method measured under H$_2$) from the crystal lattice as compared to traditional oxide routes resulting in enhanced electronic conductivity.

Figure 3A:
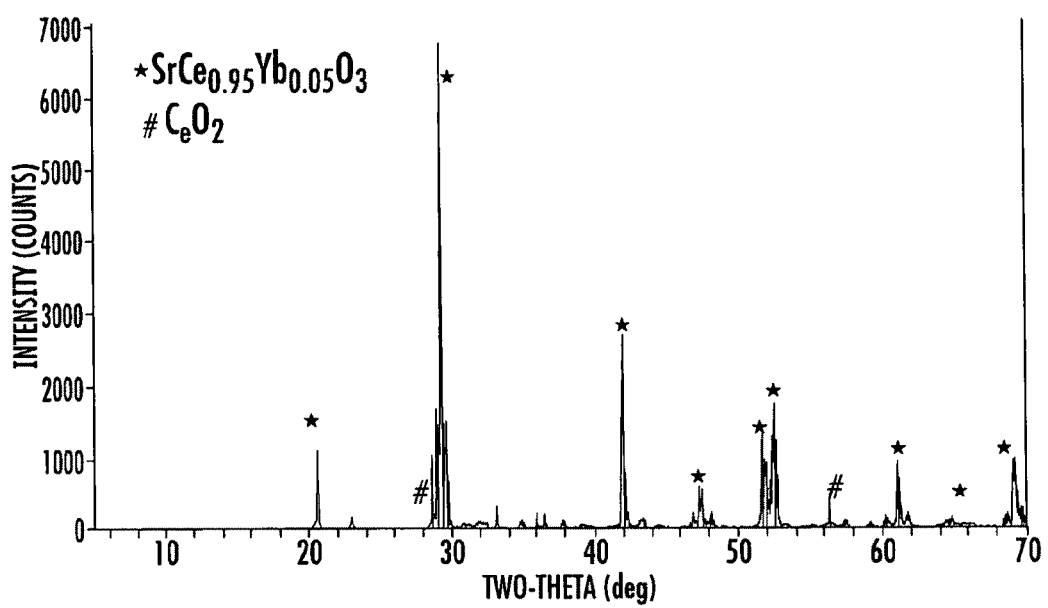
FIG. 3a sets forth XRD data of chemical formation powders synthesized for a bulk oxide process calcined at 1300° C. for five hours.
Figure 3B:
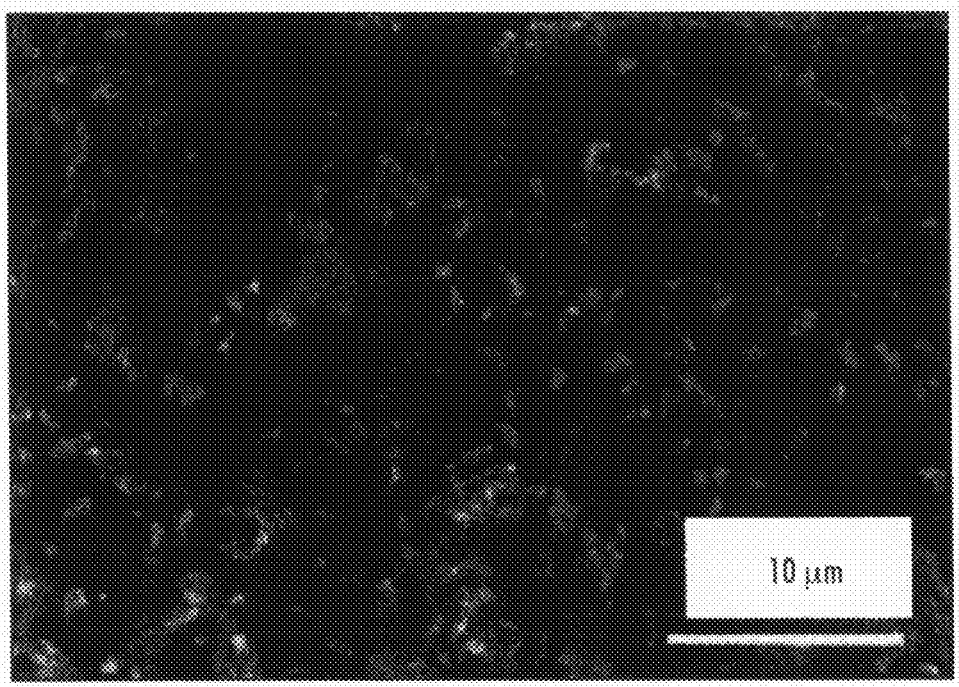
Figure 4:
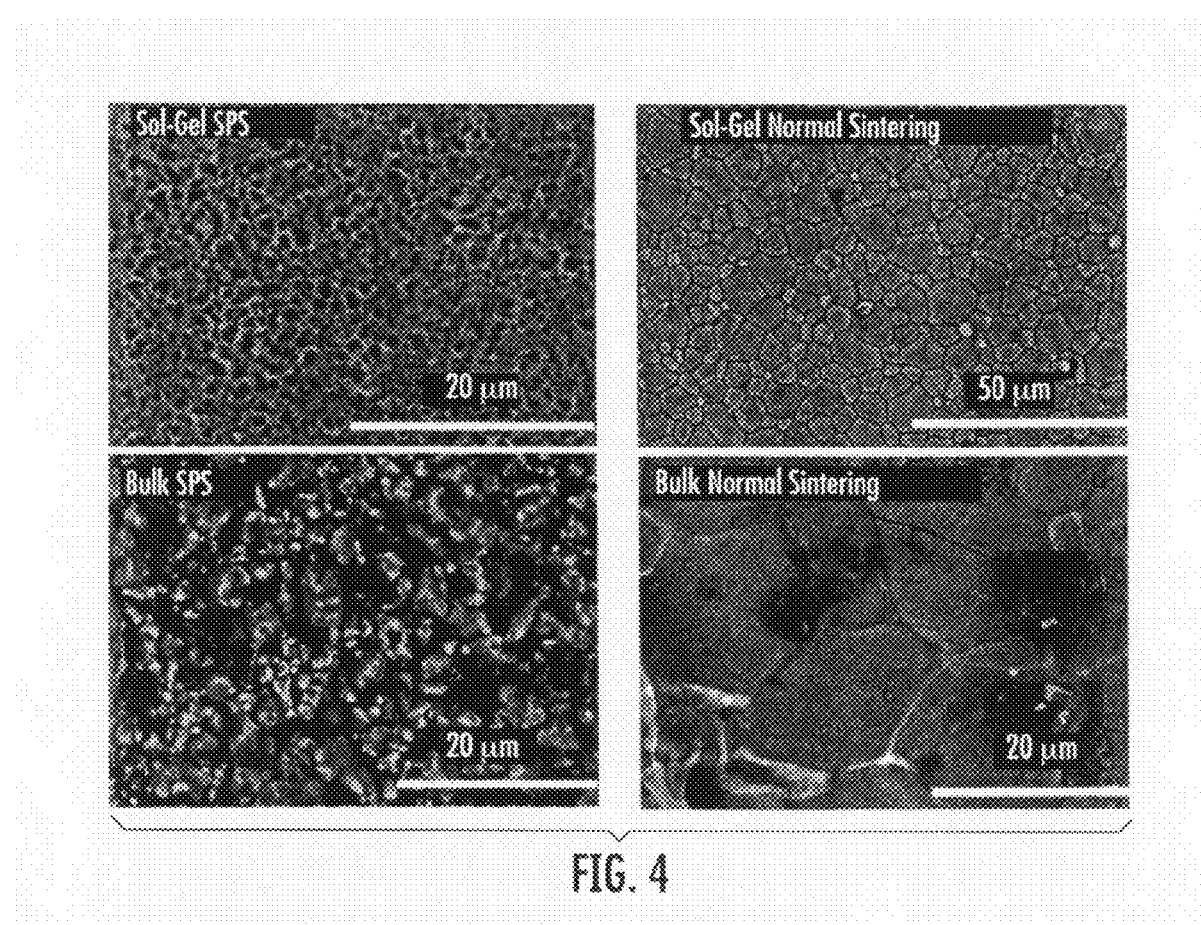
FIG. 4 sets forth four SEM comparisons of a sintered ceramic derived from a chemical self-rising approach following sintering by sps (sol-gel sps), a chemical self-rising technique using conventional sintering at 1500° C. (sol-gel normal sintering) and bulk process powders followed by sintering at 1500° C.(bulk normal sintering) and a ceramic powder using a bulk oxide route followed by SPS sintering at (bulk sps).

FIG. 3a sets forth XRD data of chemical formation powders synthesized for a bulk oxide process calcined at 1300° C. for five hours and as further seen in reference to FIG. 3b which sets forth a scanning electron micrograph of the material prepared and analyzed in reference to FIG. 3a. FIG. 4 sets forth comparisons of a sintered ceramic comparing products obtained from a chemical solution route (Sol Gel) and materials prepared from the bulk oxide route (bulk) setting forth differences in grain size of the sintered ceramics. As seen, the chemical formation powders exhibit a much smaller grain size, whether sintered with SPS or using conventional sintering at 1500° C. (normal sintering).

Figure 5A:
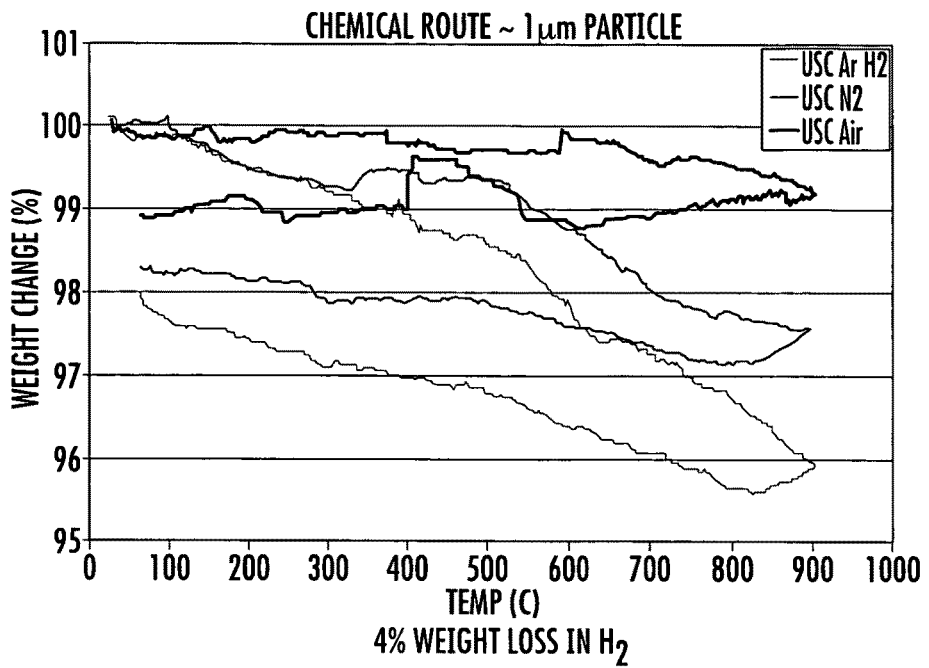
FIGS. 5a and 5b show comparative loss data for the ceramic powders processed using a chemical self-rising approach (5a) and a bulk oxide route (5b).
Figure 5B:
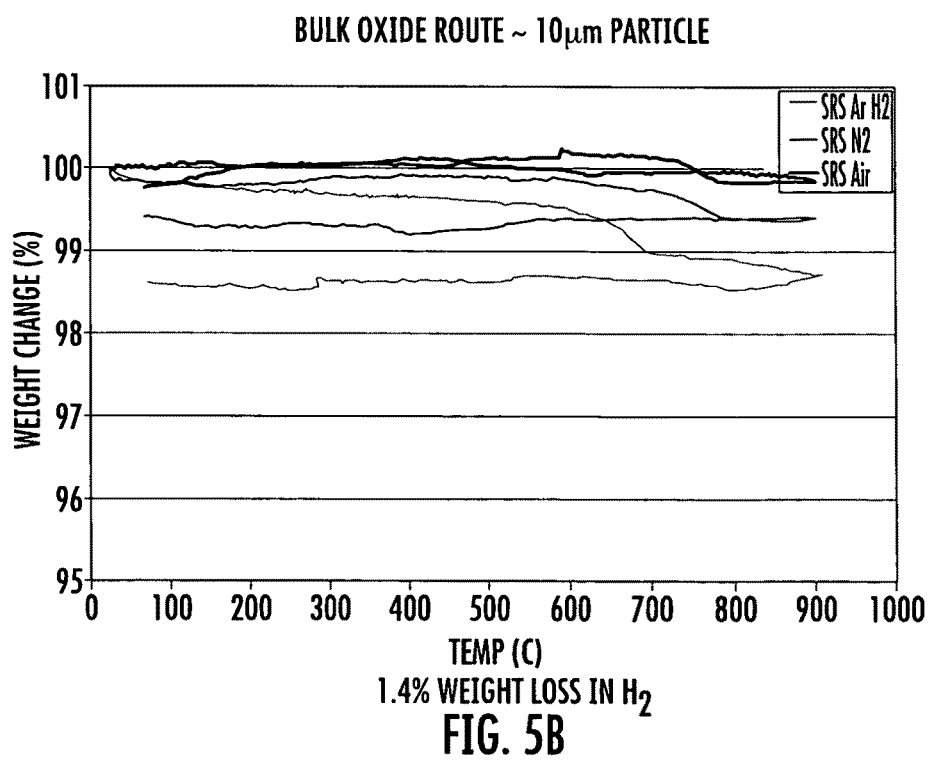

FIGS. 5a and 5b show comparative loss data using various gas mixtures for the ceramic powders processed using a chemical self-rising approach (5a) in comparison to a bulk oxide process (5b) The weight loss is attributable to the loss of oxygen provides for greater oxygen vacancy. The increase in oxygen vacancy provides for a significant increase in electronic conductivity and enhanced proton transport. It is noted that when measured with Ar/H$_2$ gas mixture, a 4 percent weight loss is detected. The weight loss is attributed to loss of oxygen.

Figure 6:
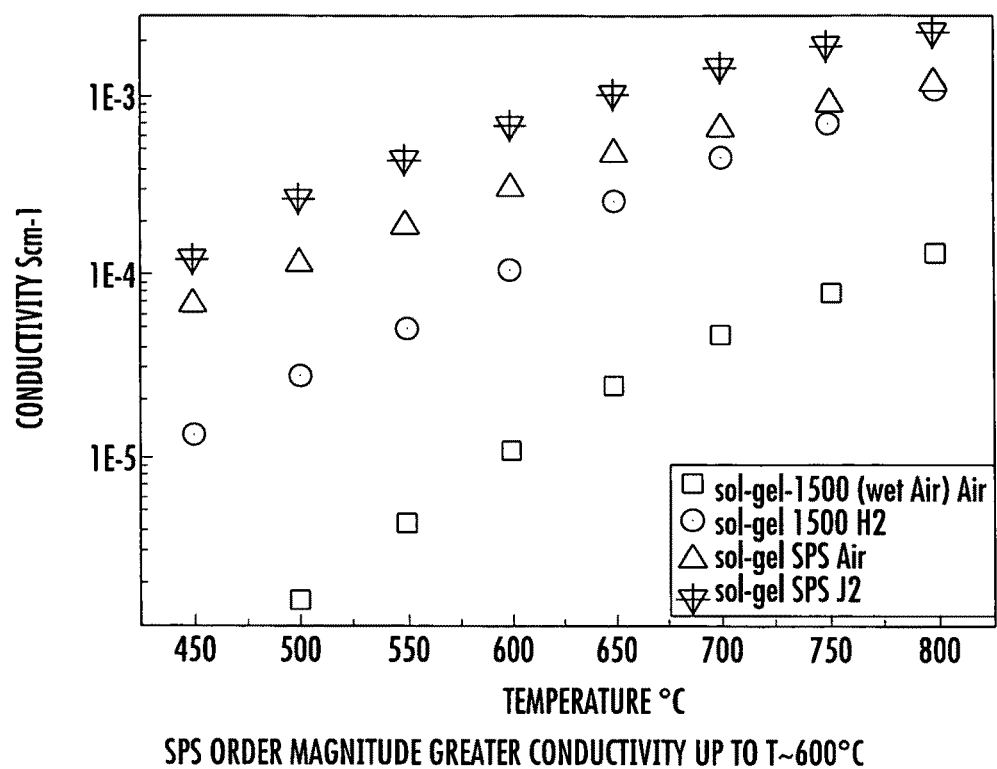
FIG. 6 is a graph setting forth enhanced conductivity of chemical self-rising sol-gel derived cerium oxide film with rapid sintering using a spark plasma sintering process.

As seen in reference to FIG. 6, enhanced conductivity may also be obtained by densifying ceramic membranes obtained from wet chemical technique by Spark Plasma Sintering. Sol-gel films made according to the above described chemical solution technique may be sintered using a spark plasma sintering process. The resulting films exhibits an order of magnitude greater conductivity in comparison to sol-gel materials made with conventional sintering processes.

The ceramic membranes described herein have enhanced transport properties which are attributable to a smaller grain size, a more easily reduced Ce, a greater number of oxygen vacancies, and which results in an increase of electric conductivity and enhanced proton transport. As such, the materials are useful for hydrogen separation membranes, hydrogen and electrochemical sensors which rely on proton/electron transport, and various catalytic reactors, energy conversion devices such as fuel cells and electrolysis cells. Both the materials and the process of making the materials offer significant improvement in providing a membrane having the functions and characteristics of the ceramic materials described herein.

The conductivity data in FIG. 6 are from samples where grain size varies from tens of microns in sol-gel conventional sintering to the one micron range with SPS sintered samples. At 600° C. the conductivity measured for the conventionally sintered material in hydrogen is primarily due to proton conductivity (1×10$^{-4}$ S/cm), with a small amount of electronic conductivity.

Spark plasma sintered samples at this same temperature have the same proton conductivity, however their total conductivity has increased by an order of magnitude due to enhanced electronic conductivity. The enhanced electron conductivity is from the reduced Ce, creating oxygen vacancies and electrons. These changes have a large impact on the material's hydrogen flux. The hydrogen flux can be described as:

$$J_{H_2} = -\frac{RT}{4F^2L}\int_{lnPH'_2}^{lnPH''_2} \frac{\sigma_e \sigma_H}{\sigma_e + \sigma_H} d\ln PH_2$$

With R gas constant (8.314 J/mol K), T temperature (K), F faraday's constant (96485 C/mol), L thickness (1×10$^{-3}$ m in this case, or 1 mm), PH$_2$ is partial pressure of hydrogen, and $\sigma_e$ and $\sigma_H$ electronic conductivity and proton conductivity respectively.

From the data in FIG. 6, using a reference temperature of 600° C., with a 1 mm thick membrane with a partial pressure driving force of 1 atm hydrogen at feed side and 1×10$^{-7}$ atm hydrogen at product side shows an order of magnitude increase in hydrogen flux from the smaller grain size SPS processed samples: from 2.85×10$^{-6}$ mol H$_2$/m$^2$ s to 2.85×10$^{-5}$ mol H$_2$/m$^2$ s.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth herein. In addition, it should be understood that aspects of the various embodiments may be interchanged, both in whole or in part. Therefore, the spirit and scope of the invention should not be limited to the description of the preferred versions contained therein.

That which is claimed:

1. A process of making a nanocrystalline proton conducting ceramic having formula ACe$_x$M$_1$-xO$_3$ where A an Sr or Ba and M is selected from the group consisting of Y, Yb, Eu, Gd, Sm and X varies from 1 to 0 and having at least about a 3% weight loss of oxygen while maintaining the ratio of chemical constituents within the ceramic comprising the steps of:
   providing a stoichiometric ratio of precursor reactants in an aqueous solution;
   adding urea and a PVA solution to the precursor reactants, said urea decomposing to NH$_3$ and CO$_2$ thereby forming a dough precursor;
   heating said dough precursor to obtain an amorphous precursor powder; and
   sintering said precursor powder to form a membrane.

2. The process according to, claim 1 wherein said sintering is a spark plasma sintering.

3. A process according to claim 1 wherein said sintering step is at a temperature of 500° C.

4. The process according to claim 1 wherein said sintering step is at a temperature between 1000° C. and 1500° C.

5. The process according to claim 1 wherein said sintering step is at a temperature of 1100° C.

6. The nanocrystalline conducting ceramic made according to claim 1 wherein said ceramic has a hydrogen flux value at least about one order of magnitude greater than a similar ceramic having an average grain size of 10 microns or greater.

7. The process according to claim 1 wherein the membrane has an average grain size of about 1.0 micron.

* * * * *